United States Patent Office 2,770,575
Patented Nov. 13, 1956

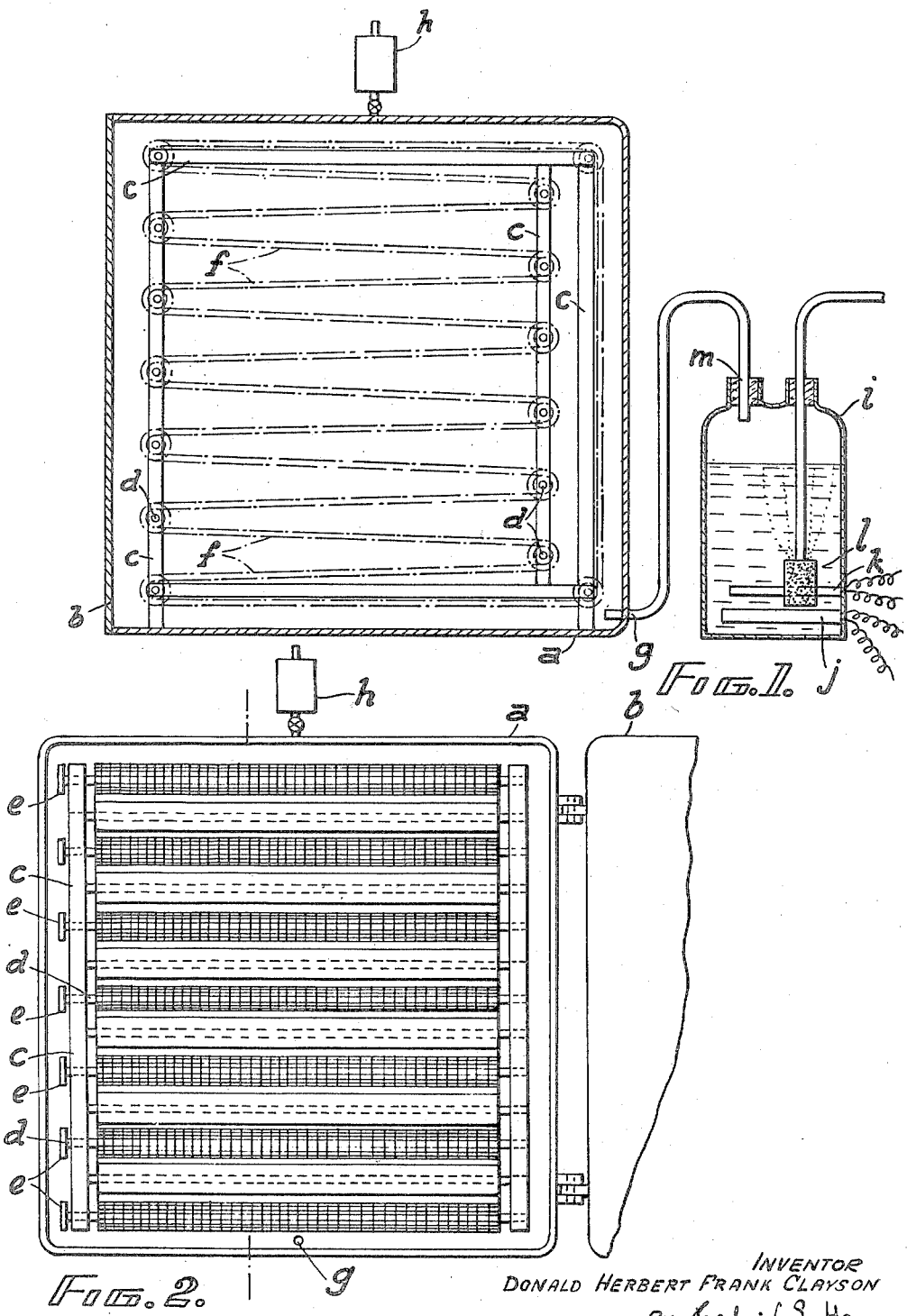

2,770,575

PRODUCTION OF BACTERIAL ENZYME PREPARATIONS AND THE CULTIVATION OF MICROORGANISM OF INDUSTRIAL AND NUTRITIONAL VALUE

Donald Herbert Frank Clayson, Stanmore, England, assignor to J. Lyons & Company Limited, London, England, a British company Application February 11, 1952, Serial No. 270,974

9 Claims. (Cl. 195—116)

This invention relates to the production of bacterial enzyme preparations and of other preparations of microbiological origin. As ordinarily practised bacterial culture for enzyme preparation is carried out on a liquid medium contained in shallow trays. The fundamental characteristic of the present invention which differentiates it from usual and known processes is that the culture is effected on an absorbent or spongy medium. The carrying of the invention into practice involves the problems of the preparation of the absorbent media, the provision of a suitable structure for supporting them, and the supply and introduction of the required additional nutrient material for the enzyme producing bacteria or other micro-organisms.

Our experimental work has shown that a suitable absorbent material may be a farinaceous material which in one experiment was composed of a dough of ordinary flour, soya flour and living baker's yeast with which an inorganic nutrient solution necessary for enzyme production was mixed. In the preparation of the dough or other non-distended medium, some of the ingredients can be mixed together before the addition of extraneous moisture and then brought to the condition of a dough by the addition of water containing soluble nutrients, or preferably, if yeast is the distending agent, the yeast can be first conveniently suspended in the nutrient solution and the nutrient solution with the yeast in suspension added to the other ingredients. In the particular experiment described, the dough was brought to the requisite absorbent or spongy condition by heat treatment after yeast fermentation, the yeast serving the dual purpose of distending the absorbent medium and providing nutrient material for the enzyme producing bacteria. The heat treatment can be used either to sterilise the medium completely, the enzyme-producing bacteria or other microorganisms being introduced at a later stage hereinafter mentioned, or, if the enzyme-producing bacteria or other-micro-organisms to be used are of a thermoduric (i. e. comparatively heat-resistant) nature they may be introduced into the original dough and the heat treatment would then be adjusted to destroy unnecessary or detrimental micro-organisms and leave the required micro-organisms surviving. In this connection it is to be noted that heat treatment may be used in conjunction with other methods of distension where, for example, baking powders or ammonium carbonate are employed in the production of absorbent media.

The dough or other non-distended medium can be supported in many ways such as on conveyor belts or trays of one kind or another, a convenient method being to provide a woven wire flexible conveyor upon the surfaces of which the dough or other non-distended medium is applied more or less thinly and subsequently heated to produce the spongy condition required and to destroy unnecessary or detrimental micro-organisms. A suitable thickness of distended medium has in our experimental work been found to be 6 mm. or less measured from the supporting structure. By this means adequate surface area can be provided and the conveyor can be caused to travel slowly in a closed chamber until the required microbial growth and/or enzyme development has been attained when the whole length of the conveyor can be treated for enzyme recovery, and/or for recovery of the microbial growth.

Distended media prepared in the manner described contain gas pockets which are ruptured by the heat treatment, allowing air to permeate into the media. Growth of aerobic micro-organisms throughout the media is thereby stimulated. During such growth, enzymes may be produced that digest the substances, such as starch and protein, that form the structure of the distended media, with a tendency for the spongy condition to disappear. Adequate enzyme production may have occurred by this stage, but if it is desired to prolong bacterial growth and/or enzyme production beyond this stage, non-digestible fibrous materials, such as glass wool, asbestos, or cellulosic material, or partially digestible fibrous materials, such as bran or oat fibre may be incorporated in the original mixture to maintain the spongy structure during the later stages of bacterial growth and/or enzyme production. Another means of prolonging bacterial growth and/or enzyme production is to incorporate a small quantity of a suitable nitrate in the medium.

In the practice of the invention the chamber in which the cultures are produced may be provided with spraying or other means by which the absorbent media may be supplied with liquid nutrient material to augment that originally introduced, and/or to introduce the required micro-organisms if they are not already present in sufficient numbers and in viable condition.

An atmosphere almost completely saturated with water vapour is necessary for the growth of most enzyme-producing bacteria. This can be produced by bubbling the air introduced into the chamber through water at a temperature slightly above the incubation temperature, to compensate for heat loss by evaporation during bubbling. After bacterial growth has become well established, water produced by bacterial metabolism may serve partially to maintain the saturated condition of the atmosphere, and less water vapour need then be introduced from outside the apparatus. For other micro-organisms not requiring an atmosphere completely saturated with water vapour, the air introduced into the chamber may be bubbled through water at the temperature required to produce air of the required moisture vapour content.

The following examples indicate the manner in which the invention can be carried out in practice.

*Example 1*

A mixture of 20 parts of wheat flour and 1 part of soya flour is prepared by dry mixing. This is made into a dough with a nutrient solution composed of equal volumes of nutrient solution A and B and containing 5% of pressed bakers' yeast in suspension.

Nutrient solution A 0.8% $K_2HPO_4$
0.45% $KH_2PO_4$
0.3% $KNO_3$

Nutrient solution B 0.3% $Mn\ SO_4.4H_2O$
0.3% $CaCl_2$

The ratio of mixed flours to nutrient solution required to produce a dough of suitable consistency will vary according to the absorptive properties of the flours, but will be of the order of 500 parts of mixed flours to 300 parts of nutrient solution. 800 to 1200 g. of this dough is rolled out into a sheet 3000 sq. cm. in area. This sheet is laid on an equal area of woven wire flexible conveyor, and moulded on to the wire by any suitable means. For treating a lesser or greater area of conveyor, the weight of dough may be lesser or greater in proportion. After the dough has been applied to the conveyor, it is allowed to ferment at about 30° C. for 3 to 4 hours, and is then sterilised in an autoclave at 20 lb. pressure for approximately 1 hour. After cooling, an aqueous suspension of enzyme producing organisms (e. g. Bacillus subtilis) is applied uniformly over the sheet of distended medium with aseptic precautions, and the inoculated distended medium on its supporting structure is placed in an atmosphere saturated with water vapour at a suitable temperature (30° to 40° C.), for bacterial growth and enzyme production. Fermentation, sterilisation and incubation can conveniently be carried out in the same autoclave.

*Example 2*

Instead of preparing the dough in sheet form as in Example 1, a thick batter may be prepared by using a smaller ratio of mixed flours to nutrient solution and applied to the woven wire conveyor by dipping or pouring or by an extruding device. This may be fermented, sterilised, inoculated and placed with its supporting structure in a saturated atmosphere for the requisite period as in Example 1.

*Example 3*

If the batter used in Example 2 tends to flow away from its supporting structure during or before the fermentation stage, its consistency may be modified to obviate this by applying more of the flour mixture by means of a powder blower or other suitable device. Alternate layers of batter and flour mixture may be thus applied until the requisite thickness of dough is produced.

*Example 4*

To prepare spongy media containing non-digestible or partially-digestible fibrous material, one may proceed as in Example 3 applying the fibrous material in place of, or in addition to, the mixed flours to the batter on the supporting structure.

*Example 5*

Spongy media containing non-digestible or partially-digestible fibrous material may also be prepared by incorporating such fibrous material in dough prepared as in Example 1 before finally rolling out into sheet form.

It will of course be understood by those conversant with this art that any of the above procedures can be varied by varying the components of the medium used.

It will also be clear that various forms of apparatus can be employed, one convenient form being illustrated by the accompanying diagrammatic drawings.

In these drawings,

Figure 1 is a side elevational diagram of the closed chamber with the front door open and Figure 2 is a front elevation through the open door.

Referring to these drawings $a$ designates the outer casing adapted to be closed by the door $b$ which makes a close fit and is constructed so as to be capable of maintaining steam under pressure within the chamber when this is necessary. Within this chamber a structure $c$ is arranged to support a number of sprocket shafts $d$ provided with pulleys $e$ adapted to be driven by any suitable means such as bevel or skew drives. An endless conveyor constructed of openwork wire belting $f$ is arranged over and under the sprocket shafts so that movement can be imparted to the conveyor upon which the absorbent material is carried as before indicated the openwork wire providing a large absorbent medium supporting area.

The chamber $a$ is preferably provided with some means of heating (not shown) and with an air inlet $g$ and an air outlet $h$ which latter is provided with means for preventing contamination of the chamber by air-borne micro-organisms. The air supplied to the chamber $a$ is passed through the apparatus shown diagrammatically in Figure 1. Compressed air from a suitable source of supply is bubbled through water contained in the vessel $i$. The vessel is fitted with an electrical heater element $j$ controlled by a thermostat $k$. The incoming air passes through porous material $l$ and bubbles through the water in the vessel $i$ and passes thence through the outlet tube $m$ into the chamber $a$ and thence to the outlet $h$ of the chamber $a$.

It will be appreciated that the foregoing is given merely for the purpose of indicating the general principles on which an apparatus for carrying out the invention should be based and in the commercial practice of the invention will doubtless be modified in many ways. It should be mentioned for instance, that a moving conveyor is not essential to the carrying out of the process and indeed in our experimental work satisfactory results have been obtained with static supports. The use of a slowly moving conveyor, however, is believed to be advantageous as movement during the growth stage should help to produce a more uniform product and minimize the tendency for the medium to drip or slip off the support. Moreover, during the recovery stage it provides a convenient means for effecting passage through dispersing solutions.

The foregoing invention provides convenient and effective methods for the cultivation of enzyme-producing bacteria and for the cultivation of other micro-organisms of industrial and nutritional value.

I claim:

1. A method of preparing a spongy, absorbent, porous substrate for use as a microbial culture medium which comprises making a dough comprising a farinaceous material, nutrients for the microbes to be cultured, and a leavening agent, followed by heating to form said substrate.

2. A method of preparing a spongy, absorbent, porous substrate for use as a microbial culture medium which comprises making a dough comprising a farinaceous material, nutrients for the microbes to be cultured and yeast, allowing the yeast to distend the dough, and heating the distended mass to form said substrate.

3. A method of preparing a spongy, absorbent, porous substrate for use as a microbial culture medium which comprises making a dough comprising wheat flour, soya flour, nutrients for the microbes to be cultured and yeast, allowing the yeast to distend the dough, and heating the distended mass to form said substrate.

4. In a method for obtaining the products of a microbial culture, the steps of preparing a spongy, absorbent, porous substrate for use as the culture medium which comprises making a dough comprising a farinaceous material, nutrients for the microbes to be cultured and a leavening agent, heating the dough to form said substrate, and inoculating said substrate with the microbe.

5. In a method of obtaining the product of a microbial culture, the steps of preparing a spongy, absorbent, porous substrate for use as the culture medium which comprises making a dough comprising a farinaceous material, nutrients for the microbes to be cultured and yeast, heating the said dough to form said substrate, and inoculating the said substrate with the microbe.

6. A method in accordance with claim 1 wherein the dough includes at least partially digestible fibrous material.

7. A method in accordance with claim 1 wherein the dough is rolled into a sheet and positioned on an open work surface.

8. A method in accordance with claim 1 wherein the dough contains water in an amount sufficient to form a viscous fluid, applying said viscous fluid to an open work surface and adding thereto a farinaceous material and a fibrous material.

9. A method in accordance with claim 2 wherein the dough is applied to an open work surface, allowing the dough to distend by the action of the yeast, and then heating the distended mass.

References Cited in the file of this patent

UNITED STATES PATENTS

| | | |
|---|---|---|
| 529,842 | Schultz | Nov. 27, 1894 |
| 1,519,801 | Riley | Dec. 16, 1924 |
| 2,325,368 | Christensen | July 27, 1943 |
| 2,440,546 | Jeffreys | Apr. 27, 1948 |

OTHER REFERENCES

Tauber: Enzyme Technology, Wiley, New York (1943), pages 121–122.